(12) United States Patent
Sasajima et al.

(10) Patent No.: US 7,661,416 B2
(45) Date of Patent: Feb. 16, 2010

(54) WORKING-GAS-CIRCULATION-TYPE ENGINE

(75) Inventors: Takashi Sasajima, Susono (JP); Daisaku Sawada, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/281,799

(22) PCT Filed: Aug. 10, 2007

(86) PCT No.: PCT/JP2007/065987

§ 371 (c)(1), (2), (4) Date: Sep. 5, 2008

(87) PCT Pub. No.: WO2008/029604

PCT Pub. Date: Mar. 13, 2008

(65) Prior Publication Data

US 2009/0188476 A1    Jul. 30, 2009

(30) Foreign Application Priority Data

Sep. 7, 2006  (JP)  ............................. 2006-242407

(51) Int. Cl.
*F02M 15/00* (2006.01)

(52) U.S. Cl. ................ 123/568.12; 123/541; 123/25 A; 123/3

(58) Field of Classification Search ............ 123/568.12, 123/568.15, 25 B, 25 E, 25 F, 1 A, 3, 198 A, 123/525, 541, DIG. 12
See application file for complete search history.

(56) References Cited

U.S. PATENT DOCUMENTS 3,362,883 A * 1/1968 Wright ........................ 376/300
3,983,882 A * 10/1976 Billings ....................... 123/1 A
6,739,125 B1 * 5/2004 Mulligan ..................... 60/286
7,434,547 B2 * 10/2008 Clawson ........................ 123/3
7,578,911 B2 * 8/2009 Nweke ........................ 204/266

FOREIGN PATENT DOCUMENTS

| JP | 2-11826 | 1/1990 |
| JP | 9-89491 | 4/1997 |
| JP | 11-93681 | 4/1999 |
| JP | 2006-77638 | 3/2006 |

* cited by examiner

*Primary Examiner*—Hai H Huynh
(74) *Attorney, Agent, or Firm*—Finnegan, Henderson, Farabow, Garrett & Dunner, LLP

(57) ABSTRACT

In an engine 10, oxygen, hydrogen serving as fuel, and argon gas serving as a working gas are supplied to a combustion chamber 21. An upstream condenser section 70 condenses water vapor contained in an exhaust gas to yield primary condensed water, through heat exchange of the exhaust gas from the combustion chamber with the ambient air, and discharges, as a primary-condensed-water-separated gas, a gas obtained by separating the primary condensed water from the exhaust gas. The primary condensed water is stored in a water storage tank 100. A downstream condenser section 80 further condenses water vapor contained in the primary-condensed-water-separated gas to yield secondary condensed water, through utilization of latent heat of vaporization of condensed water stored in the storage tank 100, and discharges a gas obtained by separating the secondary condensed water from the primary-condensed-water-separated gas. This avoids a significant drop in ratio of specific heats of the working gas.

12 Claims, 10 Drawing Sheets

WORKING-GAS-CIRCULATION-TYPE ENGINE

CROSS-REFERENCE TO RELATED APPLICATIONS

This application is a national phase application of International Application No. PCT/JP2007/065987, filed Aug. 10, 2007, and claims the priority of Japanese Application No. 2006-242407, filed Sep. 7, 2006, the contents of both of which are incorporated herein by reference.

TECHNICAL FIELD

The present invention relates to a working-gas-circulation-type engine in which oxygen, a fuel that generates water vapor through combustion, and a working gas higher in ratio of specific heats than water vapor are supplied to a combustion chamber; the fuel is burnt in the combustion chamber, thereby expanding the working gas and thus outputting power; and the working gas contained in a post-combustion (or burnt) gas (i.e., exhaust gas) exhausted from the combustion chamber is resupplied to the combustion chamber.

BACKGROUND ART

Conventionally, there has been proposed a working-gas-circulation-type hydrogen engine in which hydrogen, oxygen, and argon gas serving as a working gas are supplied to a combustion chamber; hydrogen is burnt; and the working gas contained in an exhaust gas from the combustion chamber is circulated to the combustion chamber through a circulation passage. Since argon gas is higher in ratio of specific heats than air, the hydrogen engine that uses argon gas as a working gas can be operated with high thermal efficiency.

Meanwhile, when hydrogen is burnt and combined with oxygen, water vapor is generated. Water vapor is in the form of molecules each composed of three atoms (triatomic molecules) and is thus lower in ratio of specific heats than argon gas, which is in the form of molecules each composed of a single atom (monatomic molecules). Accordingly, in the case where the working gas contained in the exhaust gas from the combustion chamber is circulated to the combustion chamber through the circulation passage, elimination of contained water vapor from the gas to be circulated (hereinafter, may be referred to as "circulation gas") is desirable. Accordingly, a conventional hydrogen engine has a condenser within a circulation passage; the condenser separates (eliminates) contained water vapor from the circulation gas through liquefaction or condensation; and a gas, obtained by the separation of water vapor in the form of condensed water from the circulation gas, is resupplied to the combustion chamber (refer to, for example, Japanese Patent Application Laid-Open (kokai) No. H11-93681).

DISCLOSURE OF THE INVENTION

However, the condenser, whether of water cooling type or of air cooling type, used in the conventional hydrogen engine separates water vapor through liquefaction or condensation by means of eventually subjecting the exhaust gas from the combustion chamber to heat exchange with the ambient air. Therefore, the temperature of the exhaust gas drops to the atmospheric temperature at the lowest. Also, the saturated water vapor content (an amount of the saturated water vapor) increases with gas temperature. Therefore, when atmospheric temperature is high, water vapor cannot be sufficiently eliminated from the exhaust gas. As a result, ratio of specific heats of the working gas decreases, causing a problem where thermal efficiency of the engine drops.

In order to cope with the above problem, a working-gas-circulation-type engine according to the present invention is an engine in which oxygen, a fuel that generates water vapor through combustion (i.e., through combining with oxygen), and a working gas higher in ratio of specific heats than water vapor are supplied to a combustion chamber and in which the fuel is burnt in the combustion chamber, thereby expanding the working gas and thus outputting power, the engine is of a type in which the working gas contained in a post-combustion gas exhausted from the combustion chamber is resupplied to the combustion chamber through a circulation passage.

Furthermore, the working-gas-circulation-type engine comprises:

a first condenser section provided in the circulation passage and adapted to condense water vapor contained in a circulation gas which is a gas flowing through the circulation passage into water to yield condensed water, through heat exchange of the circulation gas with the ambient air, thereby separating, from the circulation gas, the water vapor which has been condensed into the condensed water through the heat exchange; and a second condenser section provided in the circulation passage and adapted to condense water vapor contained in the circulation gas into water to yield condensed water, by means of cooling the circulation gas through utilization of latent heat of vaporization of the condensed water which has been condensed in the first condenser section, thereby separating, from the circulation gas, the water vapor which has been condensed into condensed water through the utilization of latent heat of vaporization.

The first condenser section and the second condenser section may be independent of each other or may share a portion. Specifically, if a section that performs condensation condenses water vapor into water for separation of water vapor, through heat exchange of the circulation gas with the ambient air, the section can serve as the first condenser section. Furthermore, if a section that performs condensation condenses water vapor contained in the circulation gas into water for separation of water vapor, through utilization of latent heat of vaporization of condensed water yielded from the first condenser section, the section can serve as the second condenser section.

Furthermore, the second condenser section may further separate water vapor from the circulation gas which has undergone separation of water vapor in the first condenser section, or the second condenser section may separate water vapor from the circulation gas in a state before undergoing separation of water vapor in the first condenser section (e.g., from the circulation gas which is an exhaust gas exhausted from the combustion chamber and introduced directly to the second condenser section).

According to the above configuration, in the first condenser section, the gas (circulation gas) flowing through the circulation passage is subjected to heat exchange with the ambient air, whereby water vapor contained in the circulation gas is condensed into water to yield condensed water so as to be separated from the circulation gas. In the second condenser section, the circulation gas is cooled through utilization of latent heat of vaporization of the condensed water which has been condensed in the first condenser section (the latent heat of vaporization is heat that is removed from the circulation gas through vaporization of the condensed water obtained in the first condenser).

According to the above configuration, water vapor that cannot be condensed in the first condenser section, which condenses water vapor through heat exchange with the ambient air, is condensed in the second condenser section, which performs cooling through utilization of latent heat of vaporization. Thus, the water vapor that cannot be condensed in the first condenser section can be separated from the circulation gas in the second condenser section. As a result, an amount of water vapor that is eliminated from the circulation gas becomes greater than an amount of water vapor that can be eliminated from the circulation gas through heat exchange with the ambient air. Thus, it is possible to avoid a drop in ratio of specific heats of a gas functioning as the working gas in the combustion chamber, which drop could otherwise result from presence of a large quantity of water vapor. This can prevent a significant decrease in thermal efficiency of the engine.

Furthermore, according to the present invention, water whose latent heat of vaporization is utilized in the second condenser section is condensed water which is yielded by the first condenser section. This can eliminate need for manual replenishment of water whose latent heat of vaporization is to be utilized in the second condenser section, or can reduce the frequency of such manual replenishment of water.

Preferably, the first condenser section is an upstream condenser section into which a pre-condensation exhaust gas, which is a gas exhausted from the combustion chamber in a state before undergoing condensation of water vapor and serving as the circulation gas, is introduced and which discharges, as a primary-condensed-water-separated gas, a gas obtained by separating, from the introduced pre-condensation exhaust gas, water vapor which has been condensed into condensed water through the heat exchange with the ambient air; and the second condenser section is a downstream condenser section into which the primary-condensed-water-separated gas is introduced and which discharges, as a secondary-condensed-water-separated gas, a gas obtained by separating, from the primary-condensed-water-separated gas, water vapor which has been condensed into condensed water through the utilization of latent heat.

According to the above configuration, in the upstream condenser section, a high-temperature pre-condensation exhaust gas from the combustion chamber is subjected to heat exchange with the ambient air, whereby water vapor contained in the pre-condensation exhaust gas is condensed into water, thereby yielding condensed water. A gas obtained by separating, from the introduced pre-condensation exhaust gas, water vapor which has been condensed into condensed water is discharged from the upstream condenser section as the primary-condensed-water-separated gas.

Furthermore, the primary-condensed-water-separated gas is introduced into the downstream condenser section and is cooled through utilization of latent heat of vaporization of condensed water which has been separated in the upstream condenser section. By this procedure, water vapor contained in the primary-condensed-water-separated gas is further condensed into water, thereby yielding condensed water. A gas obtained by separating, from the primary-condensed-water-separated gas, water vapor which has been condensed into the condensed water is discharged as the secondary-condensed-water-separated gas.

As a result, water vapor which the upstream condenser section can not eliminate through heat exchange with the ambient air is further eliminated in the downstream condenser section, thereby lowering the water vapor content of the circulation gas which is supplied to the combustion chamber through the circulation passage. Accordingly, since the ratio of specific heats of the working gas does not significantly drop, a great drop in thermal efficiency of the engine can be avoided. Furthermore, since the high-temperature pre-condensation exhaust gas from the combustion chamber is first subjected to heat exchange with the ambient air in the upstream condenser section, the quantity of condensed water to be consumed in the downstream condenser section for cooling the circulation gas can be significantly reduced as compared with the case where the high-temperature pre-condensation exhaust gas from the combustion chamber is introduced directly into the downstream condensation section. This can lower the possibility of shortage of water whose latent heat of vaporization is to be utilized in the downstream condenser section.

Preferably, the working-gas-circulation-type engine further comprises a water storage tank for storing condensed water which has been condensed in the first condenser section, and the second condenser section is configured so as to perform the latent-heat-utilizing cooling by means of using condensed water stored in the water storage tank.

According to the above configuration, when the water vapor content of the circulation gas which has passed through the first condenser section is low, and thus there is no need to use condensed water in the second condenser section (i.e., there is no need to perform cooling through utilization of latent heat of vaporization of condensed water), condensed water yielded from the first condenser section can be stored in the water storage tank. When need to use condensed water in the second condenser section arises due to excessive water vapor contained in the circulation gas which has passed through the first condenser section, the second condenser section can use condensed water stored in the water storage tank. As a result, condensed water yielded from the first condenser section can be used without waste.

Meanwhile, preferably, in the working-gas-circulation-type engine, the second condenser section is configured so as to perform the cooling through additional utilization of latent heat of vaporization of condensed water which has been condensed in the second condenser section.

According to the above configuration, condensed water yielded from the second condenser section, together with condensed water yielded from the first condenser section, can be used in the second condenser section. Thus, there can be more reliably avoided shortage of condensed water whose latent heat of vaporization is to be utilized in the second condenser section.

Desirably, the working-gas-circulation-type engine configured such that the second condenser section also utilizes condensed water yielded from the second condenser section further comprises a water storage tank for storing condensed water which has been condensed in the first condenser section and condensed water which has been condensed in the second condenser section, and the second condenser section is configured so as to perform the latent-heat-utilizing cooling by means of using condensed water stored in the water storage tank.

According to the above configuration, condensed water yielded from the first condenser section (first condensed water) and condensed water yielded from the second condenser section (second condensed water) are stored in the water storage tank. The second condenser section can use condensed water stored in the water storage tank (first condensed water and second condensed water) for cooling through utilization of latent heat of vaporization. As a result, condensed water yielded from both of the first condenser section and the second condenser section can be used without waste.

Meanwhile, the water storage tank may be composed of a first water storage tank for storing primary condensed water and a second water storage tank for storing secondary condensed water.

That is, the working-gas-circulation-type engine may further comprise:

a first water storage tank for storing condensed water which has been condensed in the first condenser section, and a second water storage tank for storing condensed water which has been condensed in the second condenser section, and the engine may be configured such that:

the second condenser section is configured so as to perform the latent-heat-utilizing cooling by means of using condensed water stored in the first water storage tank and condensed water stored in the second water storage tank.

According to the above configuration, the first condensed water is stored in the first water storage tank, and the second condensed water is stored in the second water storage tank. The second condenser section can use condensed water stored in the first water storage tank and condensed water stored in the second water storage tank (the first condensed water and the second condensed water) for cooling through utilization of latent heat of vaporization. As a result, condensed water yielded from both of the first condenser section and the second condenser section can be used without waste.

Meanwhile, preferably, any one of the above-mentioned working-gas-circulation-type engines further comprises gas-temperature-obtaining means for obtaining a temperature of the circulation gas which has passed through at least the first condenser section, and the second condenser section is configured such that usage of the condensed water whose latent heat of vaporization is utilized in the second condenser section is adjusted on the basis of the obtained temperature of the circulation gas.

The "temperature of the circulation gas which has passed through at least the first condenser section" may be the temperature of the circulation gas which has passed through the first condenser section and has not yet been cooled in the second condenser section, or the temperature of the circulation gas which has passed through both of the first condenser section and the second condenser section.

Generally, the pre-condensation exhaust gas (exhaust gas from the combustion chamber and in a state before undergoing condensation of water vapor) is high in temperature and contains a large quantity of water vapor. Meanwhile, temperature of the circulation gas which has passed through the first condenser section is close to the atmospheric temperature. Accordingly, the temperature of the circulation gas which has passed through the first condenser section reaches the dew point. In other words, the circulation gas which has passed through the first condenser section contains water vapor in a saturated condition. The saturated water vapor content depends on the temperature of the circulation gas. Accordingly, as the temperature of the circulation gas which has passed through the first condenser section becomes higher, the water vapor content of the circulation gas becomes higher.

Thus, according to the above configuration, the temperature of the gas which has passed at least the first condenser section is obtained, and the quantity of condensed water to be used in the second condenser section is adjusted (controlled) on the basis of the obtained gas temperature.

By this procedure, the second condenser section can use condensed water in such a quantity as to lower, to below a predetermined level, the water vapor content of the circulation gas to be supplied to the combustion chamber through the circulation passage. Accordingly, wasteful use of existing condensed water can be avoided. Also, according to the above configuration, an inexpensive temperature sensor having relatively high accuracy can be used as the gas-temperature-obtaining means.

Furthermore, preferably, the gas-temperature-obtaining means is configured so as to obtain a temperature of the circulation gas which has passed through the first condenser section and has not yet been cooled in the second condenser section.

When the circulation gas, which has passed through the first condenser section and has not yet been cooled in the second condenser section, has a high temperature, the water vapor content of the circulation gas to be finally supplied to the combustion chamber becomes high unless the second condenser section separates water vapor. Therefore, as in the above configuration, by means of obtaining the temperature of the circulation gas which has passed through the first condenser section and has not yet been cooled in the second condenser section and by means of adjusting the quantity of condensed water to be used in the second condenser section on the basis of the obtained temperature of the circulation gas, wasteful consumption of condensed water in the second condenser section can be avoided more reliably.

In this case, preferably, the second condenser section is configured so as not to use the condensed water when the obtained temperature of the circulation gas is lower than a predetermined temperature.

This configuration can more reliably avoid wasteful consumption of condensed water in the second condenser section.

Also, preferably, the working-gas-circulation-type engine according to the present invention further comprises water-vapor-content-obtaining means for obtaining a water vapor content of the circulation gas, and the second condenser section is configured such that usage of the condensed water whose latent heat of vaporization is utilized in the second condenser section is adjusted on the basis of the obtained water vapor content.

The circulation gas encompasses any one of the following circulation gases: an exhaust gas which has been exhausted from the combustion chamber and has not yet been cooled in any of the first condenser section and the second condenser section (pre-condensation exhaust gas); a circulation gas which has passed through the first condenser section and has not yet been cooled in the second condenser section (post-cooling-in-first-condenser-section gas); and a circulation gas which has passed through at least the second condenser section (post-cooling-in-second-condenser-section gas).

For example, by knowing the water vapor content of the pre-condensation exhaust gas and the atmospheric temperature, the water vapor content of the post-cooling-in-first-condenser-section gas can be estimated. Accordingly, usage of the condensed water whose latent heat of vaporization is utilized in the second condenser section can be appropriately adjusted on the basis of the water vapor content of the pre-condensation exhaust gas.

Also, by knowing the water vapor content of the post-cooling-in-first-condenser-section gas, usage of the condensed water whose latent heat of vaporization is utilized in the second condenser section can be appropriately adjusted in such a manner that a water vapor content of the circulation gas to be finally supplied to the combustion chamber is too excessive.

Furthermore, by knowing the water vapor content of the post-cooling-in-second-condenser-section gas, the water vapor content of the circulation gas to be finally supplied to the combustion chamber can be estimated. Accordingly, on the basis of the water vapor content of the post-cooling-in-second-condenser-section gas, usage of the condensed water whose latent heat of vaporization is utilized in the second condenser section can be appropriately adjusted in such a manner that a water vapor content of the circulation gas to be finally supplied to the combustion chamber is too excessive.

Thus, according to the above configuration, the second condenser section can use condensed water in a quantity required to make the water vapor content of the circulation gas lower than a predetermined level, so that wasteful use of condensed water which has been acquired can be avoided.

Furthermore, desirably, the water-vapor-content-obtaining means is configured so as to obtain the water vapor content of the circulation gas which has passed through the first condenser section and has not yet been cooled in the second condenser section.

When the circulation gas which has passed through the first condenser section and has not yet been cooled in the second condenser section (post-cooling-in-first-condenser-section gas) has a high water vapor content, the water vapor content of the circulation gas to be finally supplied to the combustion chamber becomes high unless the second condenser section separates water vapor. Therefore, as in the above configuration, by means of obtaining the water vapor content of the circulation gas which has passed through the first condenser section and has not yet been cooled in the second condenser section and by means of adjusting the quantity of condensed water to be used in the second condenser section on the basis of the obtained water vapor content, wasteful consumption of condensed water in the second condenser section can be avoided more reliably.

Also, preferably, the second condenser section is configured so as not to use the condensed water when the obtained water vapor content is lower than a predetermined water vapor content.

This configuration can more reliably avoid wasteful consumption of condensed water in the second condenser section.

BEST MODE FOR CARRYING OUT THE INVENTION

Embodiments of a working-gas-circulation-type engine according to the present invention will next be described with reference to the drawings. The working-gas-circulation-type engines according to the embodiments are 4-cycle cylinder-reciprocating engines in which oxygen gas and argon gas, which is a working gas of monatomic molecules, are supplied to a combustion chamber and are compressed into a high-pressure gas. In the engines, hydrogen gas serving as a fuel is injected into the high-pressure gas to thereby undergo diffusion combustion of hydrogen. Furthermore, the working-gas-circulation-type engines according to the embodiments are working-gas-circulation-type multi-cylinder hydrogen engines in which a working gas contained in exhaust gas from a combustion chamber is circulated (resupplied) to the combustion chamber through a circulation passage (circulation line).

However, the present invention can be applied to a working-gas-circulation-type engine in which oxygen, a fuel that generates water vapor through combustion, and a working gas higher in ratio of specific heats than water vapor are supplied to a combustion chamber; the fuel is burnt in the combustion chamber, thereby expanding the working gas and thus outputting power; and the working gas contained in a post-combustion gas exhausted from the combustion chamber is resupplied to the combustion chamber through a circulation passage. That is, the fuel is not limited to hydrogen, but may be of any kind, so long as the fuel generates water vapor through combustion in a combustion chamber. The working gas is not limited to argon gas, but may be of any kind, so long as the gas is higher in ratio of specific heats than water vapor. For example, the working gas may be a monatomic gas (inert gas) other than argon, such as He. The working gas may be a gas of diatomic molecules, such as nitrogen gas.

First Embodiment

Figure 1:
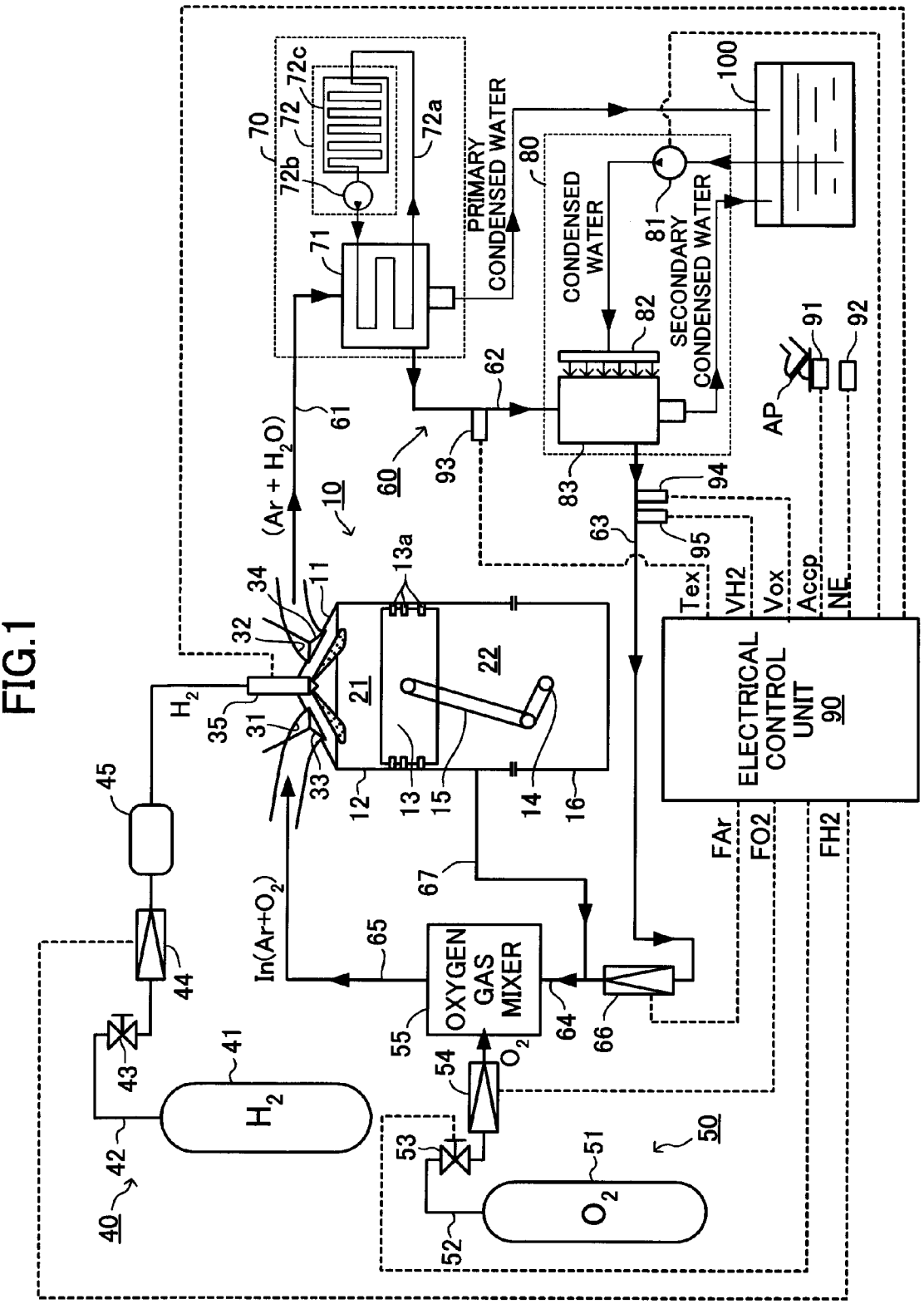
FIG. 1 is a schematic diagram of a system including a working-gas-circulation-type engine according to a first embodiment of the present invention.

FIG. 1 is a schematic diagram of a system including an engine according to a first embodiment of the present invention. The system includes a working-gas-circulation-type hydrogen engine 10, a hydrogen supply section 40, an oxygen supply section 50, a working-gas circulation passage section 60, a first condenser section 70, a second condenser section 80, an electrical control unit 90, and a water storage tank 100. It should be noted that FIG. 1 shows a section of a certain cylinder of the engine 10 and a section of an intake port and an exhaust port which are connected to the certain cylinder. However, other cylinders also have the same configuration. Notably, the working-gas circulation passage section 60 may be referred to merely as the "circulation passage 60." The first condenser section 70 may be referred to as the upstream condenser section 70, and the second condenser section 80 may be referred to as the downstream condenser section 80. Furthermore, a gas which is circulated from an exhaust port 32 to an intake port 31 through the working-gas circulation passage section 60 may be referred to as the "circulation gas."

The engine 10 is a piston-reciprocating engine including cylinder heads 11 formed in a cylinder head section, cylinders 12 formed in a cylinder block section, pistons 13 which reciprocate within the respective cylinders 12, a crankshaft 14, connecting rods 15 for connecting the pistons 13 and the crankshaft 14 together and converting a reciprocating motion of the pistons 13 to a rotary motion of the crankshaft 14, and an oil pan 16 connected to a cylinder block. Piston rings 13a are disposed on the side surfaces of the individual pistons 13.

A space defined by the cylinder head 11, the cylinder 12, and the oil pan 16 is divided by the piston 13 into a combustion chamber 21 located above the top face of the piston 13 and a crankcase 22 which accommodates the crankshaft 14.

The intake port 31 communicating with the combustion chamber 21 and the exhaust port 32 communicating with the combustion chamber 21 are formed in the cylinder head 11.

An intake valve 33 for opening and closing the intake port 31 is disposed in the intake port 31. An unillustrated intake-valve drive mechanism including an intake cam shaft is disposed on the cylinder head 11. The intake-valve drive mechanism drives the intake valve 33 for opening and closing the intake port 31.

An exhaust valve 34 for opening and closing the exhaust port 32 is disposed in the exhaust port 32. An unillustrated exhaust-valve drive mechanism including an exhaust cam shaft is disposed on the cylinder head 11. The exhaust-valve drive mechanism drives the exhaust valve 34 for opening and closing the exhaust port 32.

Furthermore, a hydrogen injection valve 35 for directly injecting hydrogen (hydrogen gas) into the combustion chamber 21 (into the cylinder) is disposed on the cylinder head 11. The hydrogen injection valve 35 injects hydrogen gas in response to a drive signal (injection instruction signal).

The hydrogen supply section 40 includes a hydrogen tank (a hydrogen gas tank or a hydrogen cylinder) 41, a hydrogen gas passage 42, a hydrogen gas pressure regulator 43, a hydrogen gas flowmeter 44, and a surge tank 45.

The hydrogen tank 41 is a gas fuel storage tank for storing hydrogen gas as fuel under high pressure. The hydrogen gas passage 42 is a passage (tube) for establishing communication between the hydrogen tank 41 and the hydrogen injection valve 35. The hydrogen gas pressure regulator 43, the hydrogen gas flowmeter 44, and the surge tank 45 are provided in the hydrogen gas passage 42, in the direction from the hydrogen tank 41 to the hydrogen injection valve 35.

The hydrogen gas pressure regulator 43 is a known pressure regulator. The hydrogen gas pressure regulator 43 reduces the pressure of hydrogen gas from the hydrogen tank 41 so as to regulate, to a predetermined value, the pressure in the hydrogen gas passage 42 at a position located downstream of the hydrogen gas pressure regulator 43 (on a side toward the surface tank 45).

The hydrogen gas flowmeter 44 measures the flow rate of hydrogen gas (hydrogen gas flow rate) flowing in the hydrogen gas passage 42 and generates a signal FH2 indicative of the hydrogen gas flow rate. The surge tank 45 reduces pulsations which are produced in the hydrogen gas passage 42 when hydrogen gas is injected.

The oxygen supply section 50 includes an oxygen tank (an oxygen gas tank or an oxygen cylinder) 51, an oxygen gas passage 52, an oxygen gas pressure regulator 53, an oxygen gas flowmeter 54, and an oxygen gas mixer 55.

The oxygen tank 51 stores oxygen gas under a predetermined pressure. The oxygen gas passage 52 is a passage (tube) for establishing communication between the oxygen tank 51 and the oxygen gas mixer 55. The oxygen gas pressure regulator 53 and the oxygen gas flowmeter 54, in the direction from the oxygen tank 51 to the oxygen gas mixer 55, are provided in the oxygen gas passage 52.

The oxygen gas pressure regulator 53 is a known regulated-pressure-variable pressure regulator. Specifically, the oxygen gas pressure regulator 53 can regulate the pressure in the oxygen gas passage 52 at a position located downstream of the oxygen gas pressure regulator 53 (on a side toward the oxygen gas mixer 55) to a target regulated pressure $RO2tgt$ corresponding to an instruction signal. In other words, the oxygen gas pressure regulator 53 can control the flow rate of oxygen gas in the oxygen gas passage 52 in response to the instruction signal.

The oxygen gas flowmeter 54 measures the flow rate of oxygen gas (oxygen gas flow rate) flowing in the oxygen gas passage 52 and generates a signal indicative of an oxygen gas flow rate $FO2$. The oxygen gas mixer 55 is disposed between a fourth passage 64 and a fifth passage 65 of the working-gas circulation passage section 60, which will be described later. The oxygen gas mixer 55 mixes oxygen supplied through the oxygen gas passage 52 and a circulation gas (mainly argon gas, which is a working gas) supplied to an inlet of the oxygen gas mixer 55 through the fourth passage 64 and discharges the resultant mixed gas to the fifth passage 65 from an outlet of the oxygen gas mixer 55.

The working-gas circulation passage section 60 includes first to fifth passages (first to fifth lines or first to fifth flow-path-forming tubes) 61 to 65, an argon gas flowmeter 66, and a blowby gas return passage 67.

The first passage 61 connects the exhaust port 32 and the inlet of the upstream condenser section 70. The second passage 62 connects the outlet of the upstream condenser section 70 and the inlet of the downstream condenser section 80. The third passage 63 connects the outlet of the downstream condenser section 80 and the inlet of the argon gas flowmeter 66. The fourth passage 64 connects the outlet of the argon gas flowmeter 66 and the inlet of the oxygen gas mixer 55. The fifth passage 65 connects the outlet of the oxygen gas mixer 55 and the intake port 31. The blowby gas return passage 67 connects the crankcase 22 and the fourth passage 64.

The argon gas flowmeter 66 measures the flow rate of argon gas (argon gas flow rate) flowing in the third passage 63 and generates a signal indicative of an argon gas flow rate $FAr$.

The blowby gas return passage 67 returns a blowby gas which leaks into the crankcase 22, to the fourth passage 64.

The upstream condenser section 70 includes an upstream water vapor separation section 71 and a cooling-water supply section 72.

The upstream water vapor separation section 71 receives a circulation gas which is a post-combustion gas (exhaust gas) exhausted from the combustion chamber 21 and is in a state before undergoing condensation of water vapor (hereinafter, the circulation gas may be referred to as the "pre-condensation exhaust gas"), via the exhaust port 32, the first passage 61, and the inlet of the upstream condenser section 70. The upstream water vapor separation section 71 cools the pre-condensation exhaust gas introduced through the inlet of the upstream condenser section 70 by use of cooling water supplied from the cooling-water supply section 72, thereby condensing (liquefying) water vapor contained in the circulation gas.

By this arrangement, the upstream water vapor separation section 71 (accordingly, the upstream condenser section 70) separates water vapor contained in the pre-condensation exhaust gas from a noncondensation gas, thereby yielding condensed water (primary condensed water), and discharges the circulation gas which is obtained by separating water vapor in the form of condensed water from the pre-condensation exhaust gas, to the exterior thereof (second passage 62) from its outlet. Primary condensed water separated in the upstream water vapor separation section 71 (accordingly, the upstream condenser section 70) is discharged from the upstream water vapor separation section 71 and is stored in the water storage tank 100.

The cooling-water supply section 72 includes a cooling-water circulation passage 72*a*, a cooling-water circulation pump 72*b*, and a cooling section 72*c*. The cooling-water circulation passage 72*a* establishes communication between the cooling-water outlet and the cooling-water inlet of the upstream water vapor separation section 71. The cooling-water circulation pump 72*b* and the cooling section 72*c* are provided in the cooling-water circulation passage 72*a*. The cooling-water circulation pump 72*b* unidirectionally circulates cooling water in the cooling-water circulation passage 72*a*. The cooling section 72*c* cools high-temperature cooling water discharged from the upstream water vapor separation section 71 through heat exchange with the ambient air. Cooling water which has been cooled in the cooling section 72*c* is supplied to the upstream water vapor separation section 71 through the cooling-water circulation pump 72*b*.

As understood from the above description, the upstream condenser section 70 serves as a first condenser section 70 provided in the circulation passage and adapted to condense water vapor contained in the circulation gas, which is a gas flowing through the circulation passage, into water to yield condensed water, through heat exchange of the circulation gas with the ambient air, thereby separating, from the circulation gas, water vapor which has been condensed into condensed water through the heat exchange. In other words, the upstream condenser section 70 receives (or introduces) the pre-condensation exhaust gas, which is the circulation gas flowing through the circulation passage, is exhausted from the combustion chamber 21, and is in a state before undergoing condensation of water vapor; subjects the received (or introduced) pre-condensation exhaust gas to heat exchange with the ambient air through cooling water so as to condense water vapor contained in the pre-condensation exhaust gas into water, thereby yielding condensed water; and discharges a gas resulting from separation of water vapor in the form of condensed water, to the second passage 62 as a primary-condensed-water-separated gas.

The downstream condenser section 80 includes a condensed-water spray pump 81, a condensed-water spray section 82, and a downstream water vapor separation section 83.

In response to a drive signal, the condensed-water spray pump 81 pumps up condensed water stored in the water storage tank 100 and supplies condensed water under pressure to the condensed-water spray section 82.

The condensed-water spray section 82 sprays condensed water supplied from the condensed-water spray pump 81, in the form of fine liquid droplets toward the outer wall of the downstream water vapor separation section 83. When the operation of the condensed-water spray pump 81 is stopped, the condensed-water spray section 82 stops spraying condensed water.

The downstream water vapor section 83 receives (or introduces) the circulation gas (primary-condensed-water-separated gas) discharged from the outlet of the upstream condenser section 70, via the second passage 62 and the inlet of the downstream condenser section 80. The downstream water vapor separation section 83 discharges the circulation gas, which has been introduced via the inlet of the downstream condenser section 80, to the third passage 63 from its outlet via the interior thereof. Condensed water sprayed from the condensed-water spray section 82 adheres to the outer wall of the downstream water vapor separation section 83 and vaporizes. Accordingly, by virtue of latent heat of vaporization of condensed water, the outer wall of the downstream water vapor separation section 83 is cooled to a temperature lower than the atmospheric temperature. Thus, the circulation gas which passes through the downstream water vapor separation section 83 is cooled to a temperature lower than the atmospheric temperature; therefore, water vapor remaining in the circulation gas is condensed. The thus-condensed water (secondary condensed water) is stored in the water storage tank 100.

That is, the downstream water vapor separation section 83 (accordingly, the downstream condenser section 80) serves as a second condenser section 80 that is provided in the circulation passage and adapted to condense water vapor contained in the circulation gas into water to yield condensed water, by means of cooling the circulation gas (primary-condensed-water-separated gas) discharged from the upstream condenser section 70 through utilization of latent heat of vaporization of condensed water which has been condensed in the upstream condenser section 70, thereby separating, from the circulation gas, water vapor which has been condensed into condensed water through the utilization of latent heat of vaporization, and that discharges the resultant circulation gas to the exterior thereof (third passage 63) as a secondary-condensed-water-separated gas.

The electrical control unit 90 is an electronic unit composed primarily of a known microcomputer including a CPU, a ROM, a RAM, a nonvolatile memory, and an interface. The electrical control unit 90 are connected with the hydrogen gas flowmeter 44, the oxygen gas flowmeter 54, the argon gas flowmeter 66, an accelerator pedal operation quantity sensor 91, an engine speed sensor 92, a gas temperature sensor 93, an oxygen concentration sensor 94, and a hydrogen concentration sensor 95. The electrical control unit 90 receives (or inputs) measurement signals (detection signals) from these meters and sensors.

The accelerator pedal operation quantity sensor 91 detects the operation quantity of an accelerator pedal AP and outputs a signal Accp indicative of the operation quantity of the accelerator pedal AP. The engine speed sensor 92 generates a signal NE indicative of an engine speed on the basis of the rotational speed of the crankshaft 14 and a signal indicative of a crank angle.

The gas temperature sensor 93 is disposed in the second passage 62. The gas temperature sensor 93 detects the temperature of the primary-condensed-water-separated gas which flows in a region of sensor location (second passage 62), and generates a signal Tex indicative of the gas temperature. The oxygen concentration sensor 94 and the hydrogen concentration sensor 95 are disposed in the third passage 63. The oxygen concentration sensor 94 detects the oxygen concentration of the circulation gas which flows in a region of sensor location (third passage 63), and generates a signal Vox indicative of the oxygen concentration. The hydrogen concentration sensor 95 detects the hydrogen concentration of the circulation gas which flows in a region of sensor location (third passage 63), and generates a signal VH2 indicative of the hydrogen concentration.

Furthermore, the electrical control unit 90 is connected to the hydrogen injection valves 35 of the cylinders, the oxygen gas pressure regulator 53, and the condensed-water spray pump 81 and sends instruction signals or drive signals to these devices.

Next, the operation of the system including the working-gas-circulation-type engine 10 having the above-described configuration will be described with reference to FIGS. 2 to 4.

Figure 2:
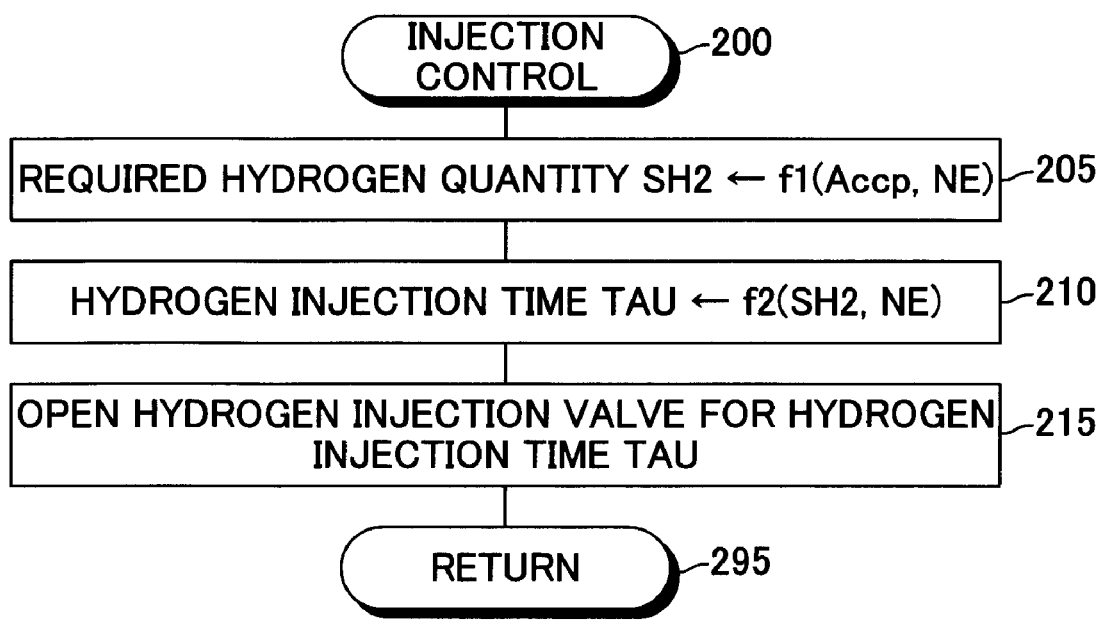
FIG. 2 is a flowchart showing a routine which a CPU of an electrical control unit shown in FIG. 1 executes.

The CPU of the electrical control unit 90 executes the injection control routine expressed by the flowchart of FIG. 2 each time the crank angle of the engine 10 becomes a predetermined crank angle (e.g., nine degrees before the top dead center of a compression stroke of each cylinder). Accordingly, when the crank angle of the engine 10 becomes the predetermined crank angle, the CPU starts executing this routine from Step 200 and proceeds to Step 205. In Step 205, the CPU obtains a required hydrogen quantity SH2 on the basis of the currently detected accelerator pedal operation quantity Accp (load), the currently detected engine speed NE, and a function f1. The function f1 (e.g., a lookup table) is predetermined for obtaining the required hydrogen quantity SH2 corresponding to an operationally required torque which is determined by the accelerator pedal operation quantity Accp and the engine speed NE.

Next, the CPU proceeds to Step 210 and converts the required hydrogen quantity SH2 to a hydrogen injection time TAU, during which the hydrogen injection valve 35 is opened, on the basis of the required hydrogen quantity SH2, the currently detected engine speed NE, and a predetermined function f2 (e.g., a lookup table). Then, the CPU proceeds to Step 215 and sends a valve-opening drive signal to the hydrogen injection valve 35 of the cylinder whose crank angle is nine degrees before the top dead center of a compression stroke, for opening the hydrogen injection valve 35 for the hydrogen injection time TAU. The CPU proceeds to Step 295 and ends the current execution of the routine. By this procedure, hydrogen is supplied to the combustion chamber 21 in a quantity required for generating a required torque and undergoes diffusion combustion.

Alternatively, the CPU may determine hydrogen gas injection timing (gas fuel injection timing) on the basis of the currently detected accelerator pedal operation quantity Accp (load), the currently detected engine speed NE, etc. and may initiate injection of hydrogen gas at the determined hydrogen gas injection timing. In any cases, hydrogen gas injection timing is set so as to be near the top dead center of a compression stroke and to stably perform diffusion combustion.

Figure 3:
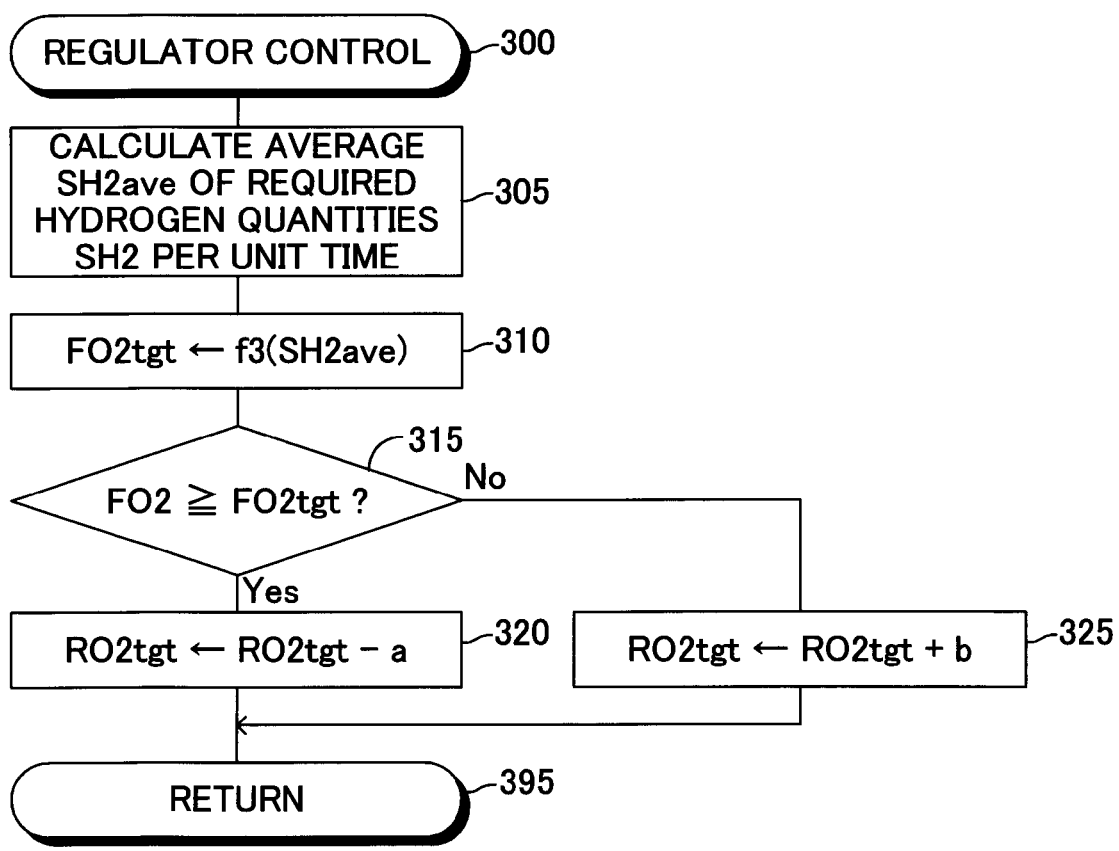
FIG. 3 is a flowchart showing a routine which the CPU of the electrical control unit shown in FIG. 1 executes.

Furthermore, the CPU executes the regulator control routine expressed by the flowchart of FIG. 3 every time a predetermined time elapses. Accordingly, when predetermined timing is reached, the CPU starts executing this routine from Step 300 and proceeds to Step 305. In Step 305, the CPU calculates an average SH2ave per unit time of the currently required hydrogen quantities SH2. This calculation is performed by adding up all of "the required hydrogen quantities SH2 of each cylinder" obtained in aforementioned Step 205 of FIG. 2, over the unit time. Next, the CPU proceeds to Step 310 and obtains a target oxygen gas flow rate FO2tgt on the basis of the thus obtained average SH2ave and a predetermined function f3 (e.g., a lookup table).

As mentioned previously, the engine 10 burns hydrogen as fuel. Accordingly, in order to generate only water through combustion of hydrogen, one mole of oxygen must be supplied for two moles of hydrogen. Thus, the function f3 is designed to determine the target oxygen gas flow rate FO2tgt so as to supply, to the combustion chamber 21, oxygen in an amount by mole which is half that of hydrogen indicated by the average SH2ave (in actuality, oxygen in an amount obtained by addition of a considerably large marginal quantity to the amount by mole of oxygen which is half the amount by mole of hydrogen).

Next, the CPU proceeds to Step 315 and judges whether or not the currently detected oxygen gas flow rate FO2 is equal to or higher than the above-mentioned target oxygen gas flow rate FO2tgt. When the CPU judges that the currently detected oxygen gas flow rate FO2 is equal to or higher than the above-mentioned target oxygen gas flow rate FO2tgt, the CPU proceeds to Step 320 and reduces the target regulated pressure RO2tgt for the oxygen gas pressure regulator 53 by a positive constant value a. This reduces the quantity of oxygen gas to be supplied to the oxygen gas mixer 55.

On the other hand, when the CPU judges that the currently detected oxygen gas flow rate FO2 is lower than the above-mentioned target oxygen gas flow rate FO2tgt, the CPU proceeds to Step 325 and increases the target regulated pressure RO2tgt for the oxygen gas pressure regulator 53 by a positive constant value b. This increases the quantity of oxygen gas to be supplied to the oxygen gas mixer 55. Accordingly, a necessary and sufficient quantity of oxygen is supplied to the combustion chamber 21 via the oxygen mixer 55. Next, the CPU proceeds to Step 395 and ends the current execution of the routine. By the above procedure, hydrogen gas and oxygen gas are supplied in respectively appropriate quantities to the combustion chamber 21.

Figure 4:
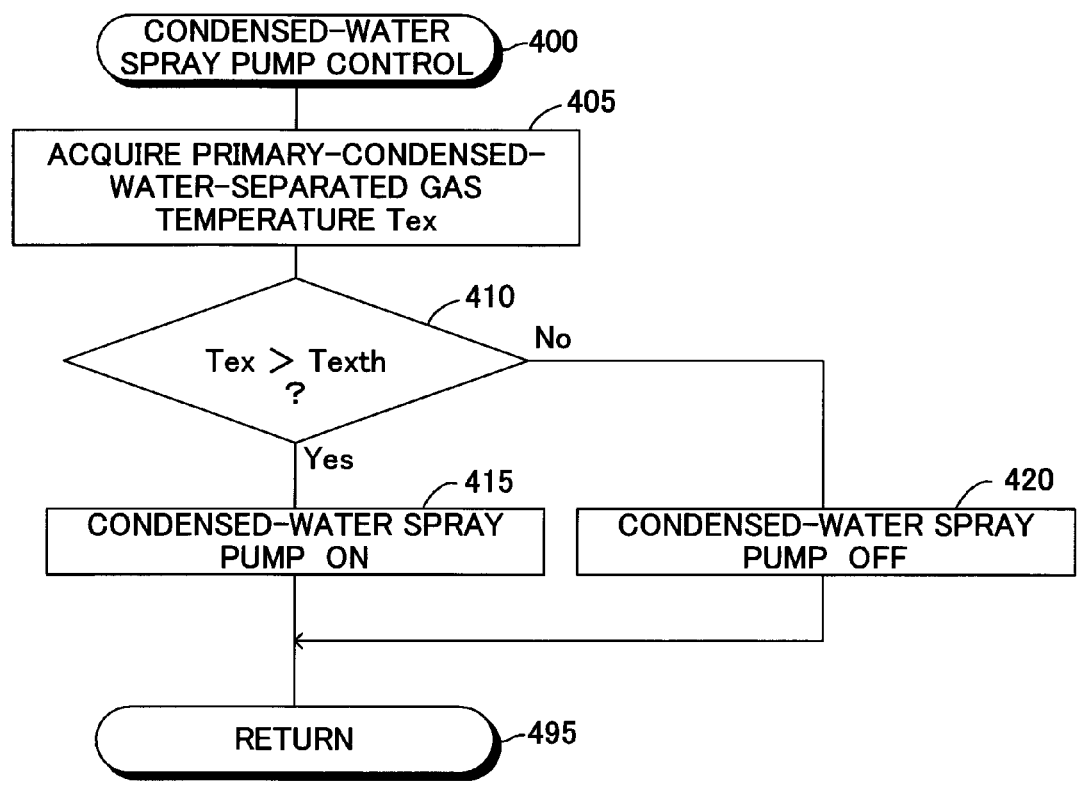
FIG. 4 is a flowchart showing a routine which the CPU of the electrical control unit shown in FIG. 1 executes.

Furthermore, the CPU executes the condensed-water spray pump control routine expressed by the flowchart of FIG. 4 every time a predetermined time elapses. Accordingly, when predetermined timing is reached, the CPU starts executing this routine from Step 400 and proceeds to Step 405. In Step 405, the CPU obtains a current gas temperature (the temperature of the circulation gas which has passed through the upstream condenser section 70 and is in a state before entry into the downstream condenser section 80; i.e., the temperature of the primary-condensed-water-separated gas) Tex. Next, the CPU proceeds to Step 410 and judges whether or not the obtained gas temperature Tex is higher than a predetermined temperature Texth.

Figure 5:
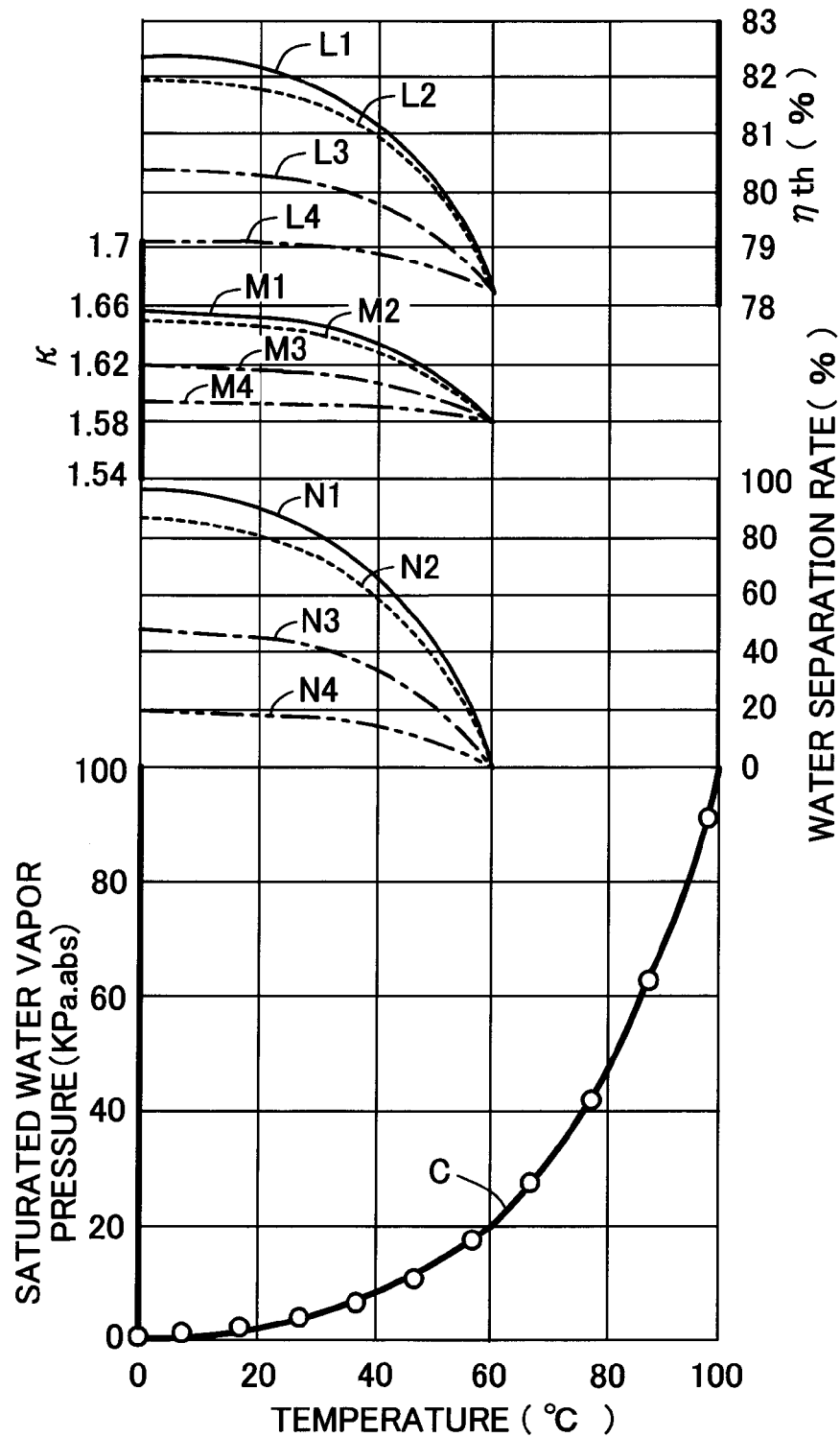
FIG. 5 is a graph showing variations with gas temperature in the theoretical thermal efficiency of engine, the ratio of specific heats of gas, water separation rate, and saturated water vapor pressure.

Meanwhile, a curve C in FIG. 5 shows a relationship between gas temperature and saturated water vapor pressure. Suppose that, when gas temperature is 60° C., the gas contains about 20 kPa of water vapor. Here, curves L1 to L4 show relationships between gas temperature and the theoretical thermal efficiency ηth of engine; curves M1 to M4 show relationships between gas temperature and the ratio of specific heats K of gas; and curves N1 to N4 show relationships between gas temperature and water separation rate. The curves L1, M1, and N1 are curves obtained in the case where water vapor is completely condensed and separated over the entire temperature range (saturated condensation); the curves L2, M2, and N2 are curves obtained in the case where water vapor is condensed and separated by 90% the quantity of the saturated condensation case over the entire temperature range; the curves L3, M3, and N3 are curves obtained in the case where water vapor is condensed and separated by 50% the quantity of the saturated condensation case over the entire temperature range; and the curves L4, M4, and N4 are curves obtained in the case where water vapor is condensed and separated by 20% the quantity of the saturated condensation case over the entire temperature range.

As understood from FIG. 5, as water separation rate is increased by lowering gas temperature, the ratio of specific heats κ of gas increases; as a result, the theoretical thermal efficiency ηth of engine rises. Note that, when the compression ratio of engine is represented by ε, the theoretical thermal efficiency ηth of engine can be expressed by the following Eq. (1).

$$\eta th = 1 - (1/\epsilon^{\kappa-1}) \tag{1}$$

Thus, as the water vapor content of the gas to be supplied to the combustion chamber 21 lowers, the engine 10 can be run with higher thermal efficiency (more efficiently).

Suppose that the gas temperature Tex obtained in Step 405 is higher than the predetermined temperature Texth. In this case, a large quantity of water vapor remains in the primarycondensed-water-separated gas. Accordingly, unless water vapor is separated from the primary-condensed-water-separated gas by being further condensed in the downstream condenser section 80, the water vapor content of the circulation gas is too large, and thus the ratio of specific heats of the working gas decreases, resulting in a drop in thermal efficiency of the engine 10. In view of above, the CPU makes a "Yes" judgment in Step 410 and proceeds to Step 415. In Step 415, the CPU sends, to the condensed-water spray pump 81, a drive signal for running the condensed-water spray pump 81. Subsequently, the CPU proceeds to Step 495 and ends the current execution of the routine.

As a result, condensed water stored in the water storage tank 100 is sprayed from the condensed-water spray section 82 toward the outer wall of the downstream water vapor separation section 83 and vaporizes on the outer wall. At this time, vaporizing condensed water removes latent heat of vaporization, thereby cooling the outer wall of the downstream water vapor separation section 83 to a temperature lower than the atmospheric temperature. Accordingly, the circulation gas (primary-condensed-water-separated gas) which passes through the downstream water vapor separation section 83 is cooled to a temperature lower than the atmospheric temperature; thus, water vapor remaining in the circulation gas is liquefied through condensation. As a result, the water vapor content of the circulation gas, which is discharged from the lower condenser section 80 (lower water vapor separation section 83) and is supplied to the combustion chamber 21 via the circulation passage, drops, whereby the thermal efficiency of engine is maintained at a high value. At this time, condensed water which is condensed in the lower water vapor separation section 83 is stored in the water storage tank 100.

Meanwhile, when the obtained gas temperature Tex is equal to or lower than the predetermined temperature Texth, the water vapor content of the primary condensed-water-separated gas is relatively low. Accordingly, the engine 10 can be run with relatively high thermal efficiency without cooking the circulation gas through utilization of latent heat of vaporization of condensed water in the downstream condenser section 80 (i.e., without further separating water vapor, through condensation, from the primary-condensed-water-separated gas). Therefore, the CPU makes a "No" judgment in Step 410 and proceeds to Step 420. In Step 420, the CPU stops running the condensed-water spray pump 81. Subsequently, the CPU proceeds to Step 495 and ends the current execution of the routine. This can avoid wasteful use of condensed water stored in the water storage tank 100. Notably, condensed water yielded in the upstream condenser section 70 is supplied to the water storage tank 100, irrespective of whether or not the condensed-water spray pump 81 is run (whether or not separation of water vapor is performed in the downstream condenser section 80 through utilization of latent heat of vaporization).

As described above, the engines 10 according to the first embodiment of the present invention is configured such that latent heat of vaporization of condensed water yielded in the upstream condenser section 70 is utilized in the downstream condenser section 80, thereby further separating water vapor from the circulation gas (in actuality, the primary-condensed-water-separated gas), and the water-vapor-separated gas (the secondary-condensed-water-separated gas) is resupplied to the combustion chamber 21. Accordingly, because the water vapor content of the gas to be resupplied to the combustion chamber 21 can be lowered, the ratio of specific heats of the gas which functions as the working gas does not decrease. As a result, the engine 10 can continuously run with high thermal efficiency.

Second Embodiment

Figure 6:
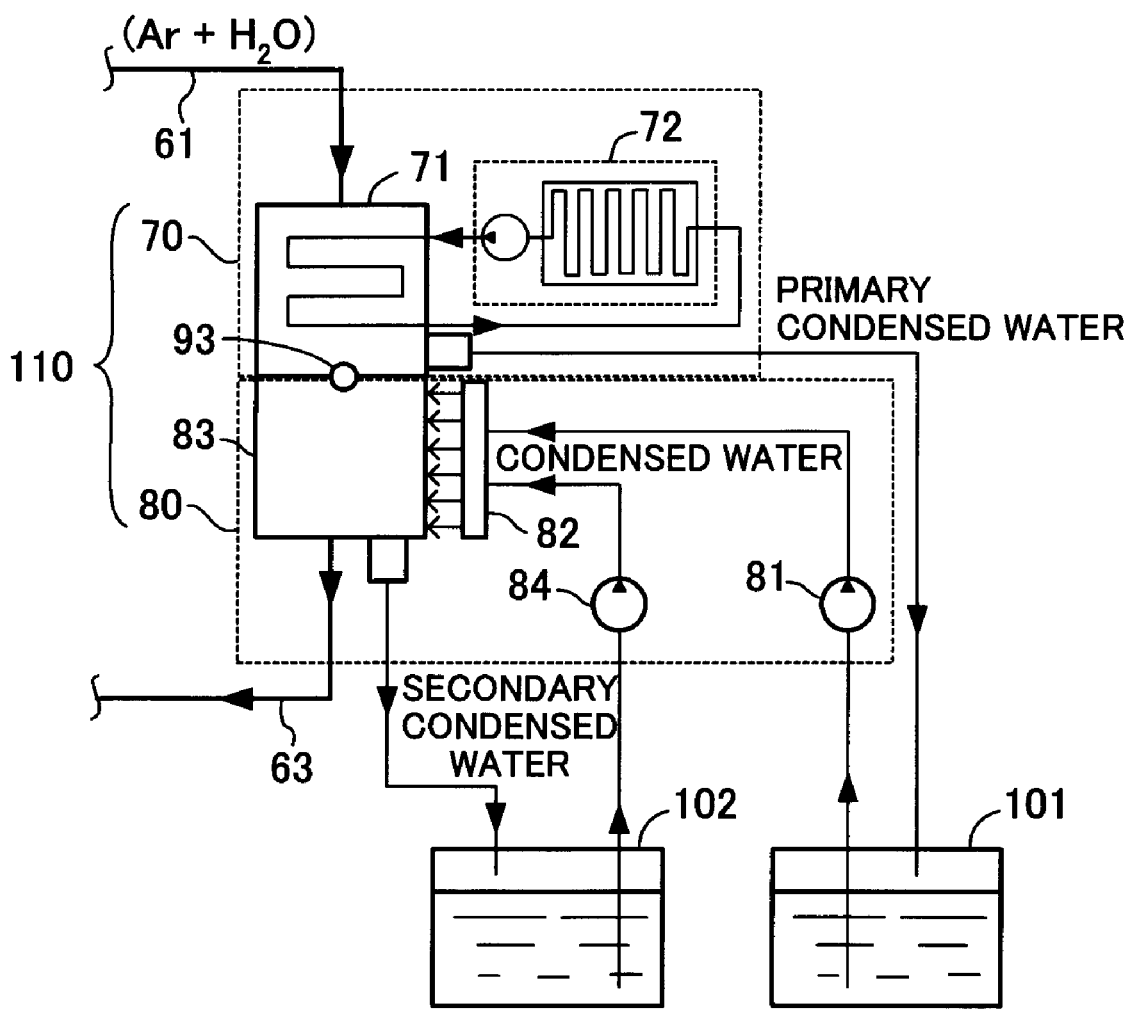
FIG. 6 is a partial schematic view of a working-gas-circulation-type engine according to a second embodiment of the present invention.

As shown in FIG. 6, an engine according to a second embodiment of the present invention differs from the engine of the first embodiment in that there is provided a single condenser section 110 in which the upstream condenser section 70 and the downstream condenser section 80 are directly coupled with each other without use of the second passage 62 used in the first embodiment; in that, in place of the water storage tank 100 of the first embodiment, a first water storage tank 101 and a second water storage tank 102 are provided; and in that, in addition to the first pump 81, a second pump 84 is provided. Accordingly, the following description specially focuses on these points of difference.

The condenser section 110 is configured such that the outlet of the upstream condenser section 70 and the inlet of the downstream condenser section 80 are directly connected together. The gas temperature sensor 93 is disposed at a portion of connection between the upstream condenser section 70 and the downstream condenser section 80.

The first water storage tank 101 stores primary condensed water discharged from the upstream condenser section 70 (accordingly, the upstream water vapor separation section 71). The second water storage tank 102 stores secondary condensed water discharged from the downstream condenser section 80 (accordingly, the downstream water vapor separation section 83). In response to a drive signal, the first pump 81 pumps up condensed water stored in the first water storage tank 101 and supplies condensed water under pressure to the condensed-water spray section 82. In response to a drive signal, the second pump 84 pumps up condensed water stored in the second water storage tank 102 and supplies condensed water under pressure to the condensed-water spray section 82. The condensed-water spray section 82 sprays condensed water supplied from at least one of the first pump 81 and the second pump 84, in the form of fine liquid droplets toward the outer wall of the downstream water vapor separation section 83.

The engine according to the second embodiment operates in a manner similar to that of the first embodiment. However, when the CPU executes Step 415 of FIG. 4, the CPU simultaneously runs the first pump 81 and the second pump 84, and, when the CPU executes Step 420, the CPU simultaneously stops running the first pump 81 and the second pump 84.

Accordingly, this configuration can also effectively use primary condensed water and secondary condensed water. In contrast to the first embodiment, since there is no need to connect the outlet of the upstream condenser section 70 with the inlet of the downstream condenser section 80 by the second passage 62, the cost of the entire engine can be reduced.

As described above, the working-gas-circulation-type engines according to the above embodiments of the present invention are such that, even when the atmospheric temperature is high, the water vapor content of the circulation gas to be resupplied to the combustion chamber 21 can be lowered through utilization of latent heat of vaporization of condensed water which is yielded through heat exchange of the circulation gas with the ambient air. Accordingly, since the content of water vapor, whose ratio of specific heats is low, in the working gas can be lowered, the ratio of specific heats of the working gas does not decrease. As a result, these engines can continuously run with high thermal efficiency.

The present invention is not limited to the above-described embodiments, but may be modified into various other forms without departing from the scope of the invention. For example, the engines according to the above embodiments employ diffusion combustion of hydrogen. However, the present invention can be applied to an engine which carries out auto-ignition combustion operation or flame-propagation combustion operation, which is effected by sparks from an ignition plug disposed in the combustion chamber 21.

Figure 7:
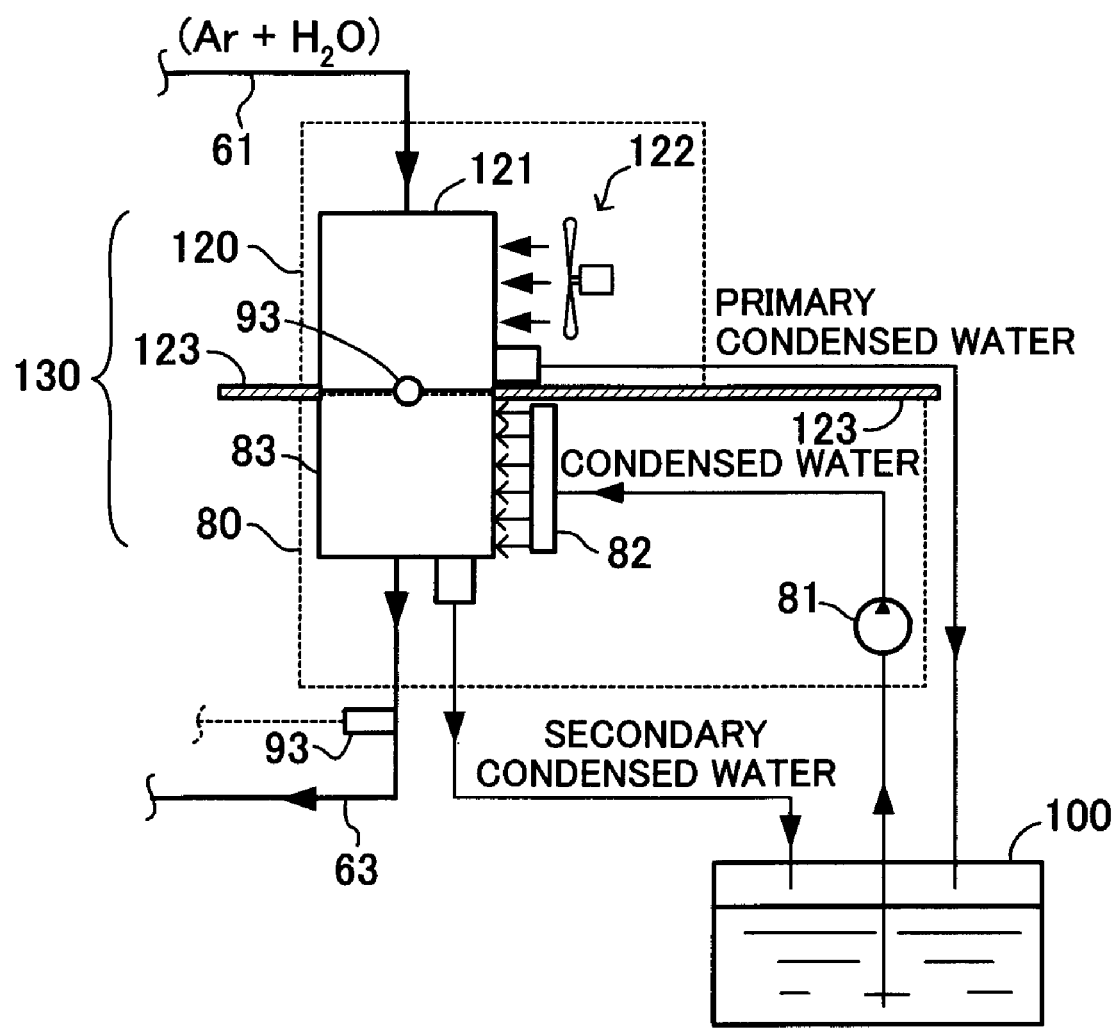
FIG. 7 is a partial schematic view of a working-gas-circulation-type engine according to a first modification of the present invention.

Also, in the first and second embodiments, the upstream condenser section (first condenser section) 70 is of a water cooling type, but may be of, for example, an air cooling type as shown in FIG. 7. Specifically, in a first modification shown in FIG. 7, an upstream condenser section 120 has a motor-driven fan 122 in place of the cooling-water supply section 72, and an upstream condensed-water separation section 121, which replaces the upstream water vapor separation section 71, is cooled through subjection to air blow from the motor-driven fan 122. Thus, the circulation gas introduced through the inlet of the upstream condenser section 120 is cooled so as to condense water vapor contained in the circulation gas. In this case, desirably, a partition 123 is provided between the upstream condenser section 120 and the downstream condenser section 80.

Figure 8:
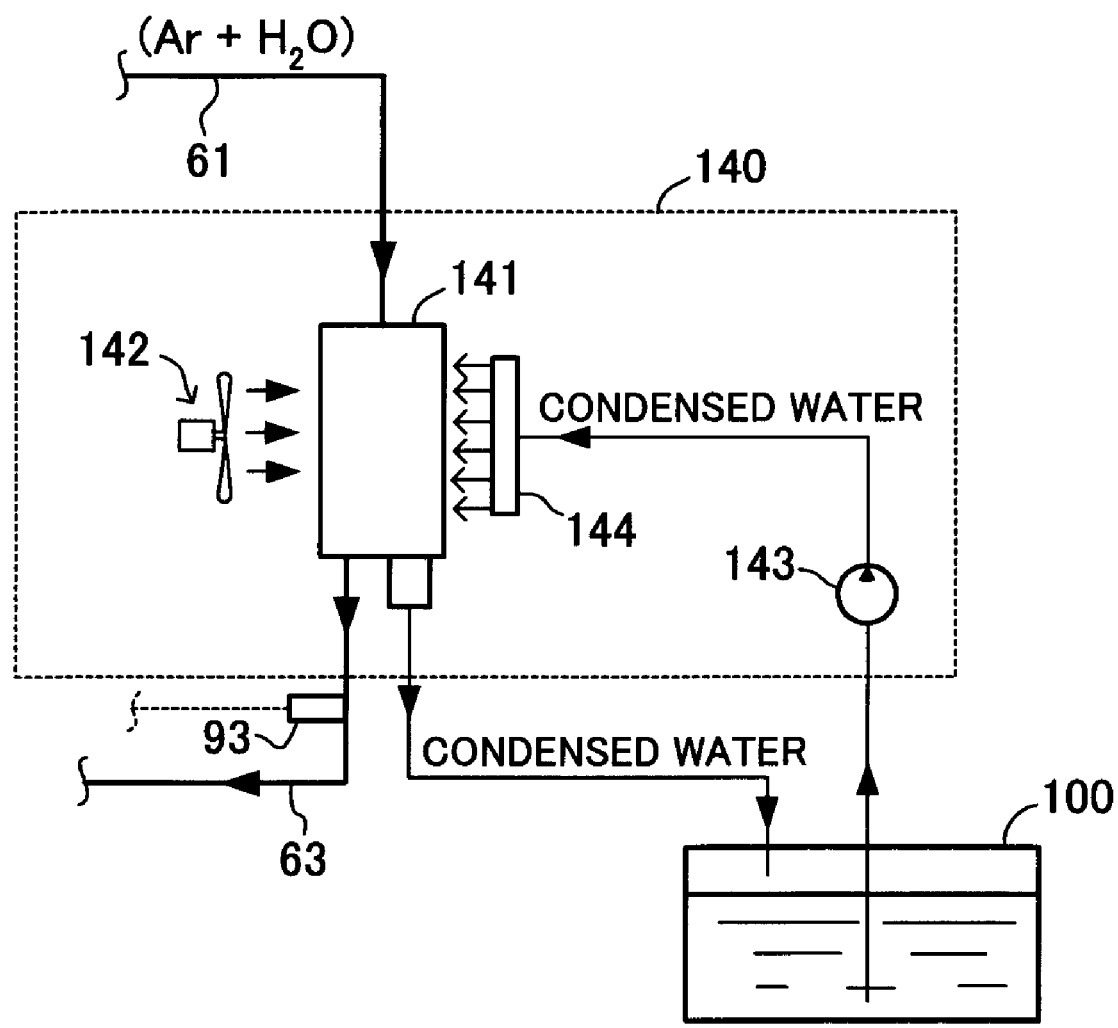
FIG. 8 is a partial schematic view of a working-gas-circulation-type engine according to a second modification of the present invention.

As shown in FIG. 8, which is a partial configurational view of a second modification, the above-mentioned upstream condenser section (first condenser section) and the above-mentioned downstream condenser section (second condenser section) may share a water vapor separation section. Specifically, a condenser section 140 shown in FIG. 8 includes a water vapor separation section 141, a motor-driven fan 142, a condensed-water spray pump 143, and a condensed-water spray section 144.

The motor-driven fan 142 sends the air to the water vapor separation section 141. The water vapor separation section 141 condenses water vapor contained in the pre-condensation exhaust gas (circulation gas) which is introduced into the water vapor separation section 141 through the first passage 61 to yields condensed water, through heat exchange of the introduced pre-condensation exhaust gas with the air sent from the motor-driven fan 142. The water vapor separation section 141 discharges, to the third passage 63, a gas obtained by separating water vapor in the form of condensed water from the pre-condensation exhaust gas. Accordingly, the water vapor separation section 141 and the motor-driven fan 142 constitute the aforementioned first condenser section which separates water vapor through heat exchange with the ambient air. Condensed water which is condensed in the water vapor separation section 141 is supplied to the water storage tank 100.

In response to a drive signal, the condensed-water spray pump 143 pumps up condensed water stored in the water storage tank 100 and supplies condensed water under pressure to the condensed-water spray section 144. The condensed-water spray section 144 sprays condensed water supplied from the condensed-water spray pump 143, in the form of fine liquid droplets toward the outer wall of the water vapor separation section 141. Condensed water sprayed on the outer wall of the water vapor separation section 141 vaporizes.

Thus, the water vapor separation section 141 cools the pre-condensation exhaust gas (circulation gas) introduced into the water vapor separation section 141 through the first passage 61, through utilization of latent heat of vaporization of condensed water sprayed toward the outer wall of the water vapor separation section 141, thereby condensing water vapor contained in the introduced pre-condensation exhaust gas into water and thus yielding condensed water. The water vapor separation section 141 discharges, to the third passage 63, the circulation gas obtained by separating water vapor in the form of condensed water from the pre-condensation exhaust gas. Accordingly, the water vapor separation section 141, the condensed-water spray pump 143, and the condensed-water spray section 144 constitute the aforementioned second condenser section which separates water vapor through utilization of latent heat of vaporization.

Notably, in this case, the gas temperature sensor 93 can be disposed in the third passage 63. When the operation of the condensed-water spray pump 143 is stopped, the gas temperature sensor 93 detects the temperature Tex of the circulation gas discharged from the first condenser section composed essentially of the water vapor separation section 141 and the motor-driven fan 142. On the basis of the thus-obtained temperature Tex of the circulation gas, the CPU controls the condensed-water spray pump 143. Specifically, when the obtained gas temperature Tex is higher than the predetermined temperature Texth, the CPU runs the condensed-water spray pump 143, and, when the obtained gas temperature Tex is equal to or lower than the predetermined temperature Texth, the CPU stops running the condensed-water spray pump 143.

Also, in the first embodiment, condensed water discharged from the lower condenser section 80 may not be stored in the water storage tank 100. Similarly, in the second embodiment, the second water storage tank 102 and the second pump 84 may be eliminated.

Furthermore, in the above-described embodiments, the condensed-water spray pump 81 (or the first pump 81 and the second pump 84) is controlled to be in either of running stage or stop stage. In place of such control, a discharge amount of the condensed-water spray pump 81 (or the first pump 81 and the second pump 84) may be varied continuously on the basis of the gas temperature obtained by the temperature sensor 93 (or another temperature sensor to be described later) or on the basis of water vapor content obtained by a water vapor content sensor to be described later, so as to control an amount of condensed water whose latent heat of vaporization is utilized in the downstream condenser section 80 according to the obtained gas temperature or the obtained water vapor content. In this case, preferably, usage (or an amount) of condensed water whose latent heat is utilized in the downstream condenser section 80 increases, as the obtained gas temperature or the obtained water vapor content increases.

Additionally, in the first embodiment, in place of or in addition to the temperature sensor 93, a temperature sensor may be disposed in the third passage 63, and, on the basis of the temperature of the circulation gas detected by the temperature sensor, the condensed-water spray pump 81 (or the first pump 81 and the second pump 84) may be controlled.

In this case, when condensation of water vapor through utilization of latent heat of vaporization is not carried out in the downstream condenser section 80 (when the condensed-water spray pump 81 is not run), the temperature sensor disposed in the third passage 63 obtains substantially the temperature of the circulation gas which has passed through the upstream condenser section (first condenser section) 70. Accordingly, on the basis of the temperature of the circulation gas obtained by the temperature sensor, the condensed-water spray pump 81 can be controlled in a manner similar to that of the first embodiment.

Also, when condensation of water vapor through utilization of latent heat of vaporization is carried out in the downstream condenser section 80 (when the condensed-water spray pump 81 is run), the temperature sensor disposed in the third passage 63 obtains the temperature of the circulation gas from which water vapor has been separated through subjection to cooling in both of the first condenser section 70 and the second condenser section 80. Accordingly, on the basis of the temperature of the circulation gas obtained by the temperature sensor, the quantity of water vapor supplied to the combustion chamber 21 can be known; therefore, the discharge (the discharge amount) of the condensed-water spray pump 81 can be controlled such that the quantity of water vapor supplied to the combustion chamber 21 becomes an appropriate quantity or less. That is, the system can be configured such that the second condenser section 80 uses condensed water in such a quantity as to lower, to below a predetermined level, the water vapor content of the circulation gas to be supplied to the combustion chamber 21.

Furthermore, the engine 10 according to the first embodiment may have water-vapor-content-obtaining means (e.g., a water vapor sensor) for obtaining the water vapor content of the circulation gas, in place of the gas temperature sensor 93. In this case, the CPU may control the operation of the condensed-water spray pump 81 on the basis of the obtained water vapor content so as to regulate or control usage of condensed water whose latent heat of vaporization is utilized in the second condenser section 80.

For example, by knowing the water vapor content of the pre-condensation exhaust gas and the atmospheric temperature, the water vapor content of the post-cooling-in-first-condenser-section gas can be estimated. Accordingly, a water vapor sensor is disposed in the first passage 61 for obtaining the water vapor content of the pre-condensation exhaust gas, and the CPU estimates the water vapor content of the post-cooling-in-first-condenser-section gas on the basis of the water vapor content obtained by the water vapor sensor and the atmospheric temperature obtained by a separately provided atmospheric temperature sensor. Then, the CPU can be configured so as to appropriately regulate usage of condensed water whose latent heat of vaporization is utilized in the second condenser section 80, on the basis of the estimated water vapor content.

Alternatively, a water vapor sensor may be disposed in the second passage 62 for obtaining the water vapor content of the post-cooling-in-first-condenser-section gas, and the CPU may control the operation of the condensed-water spray pump 81 so as to regulate or control usage of condensed water whose latent heat of vaporization is utilized in the second condenser section 80, on the basis of the water vapor content obtained by the water vapor sensor.

Furthermore, a water vapor sensor may be disposed in the third passage 63 for obtaining the water vapor content of the post-cooling-in-second-condenser-section gas, and the CPU may control the operation of the condensed-water spray pump 81 so as to regulate or control usage of condensed water whose latent heat of vaporization is utilized in the second condenser section 80, on the basis of the water vapor content of the post-cooling-in-second-condenser-section gas (i.e., the water vapor content of the circulation gas to be finally supplied to the combustion chamber 21) obtained by the water vapor sensor.

Furthermore, in the first embodiment, the first condenser section (upstream condenser section) 70 is disposed upstream with respect to the flow of the circulation gas, and the second condenser section (downstream condenser section) 80 is disposed downstream. That is, the first condenser section 70 and the second condenser section 80 are disposed in series along the flow of the circulation gas. By contrast, for example, as shown in FIGS. 9 and 10, the first condenser section and the second condenser section may be disposed in parallel along (or with respect to) the flow of the circulation gas.

Figure 9:
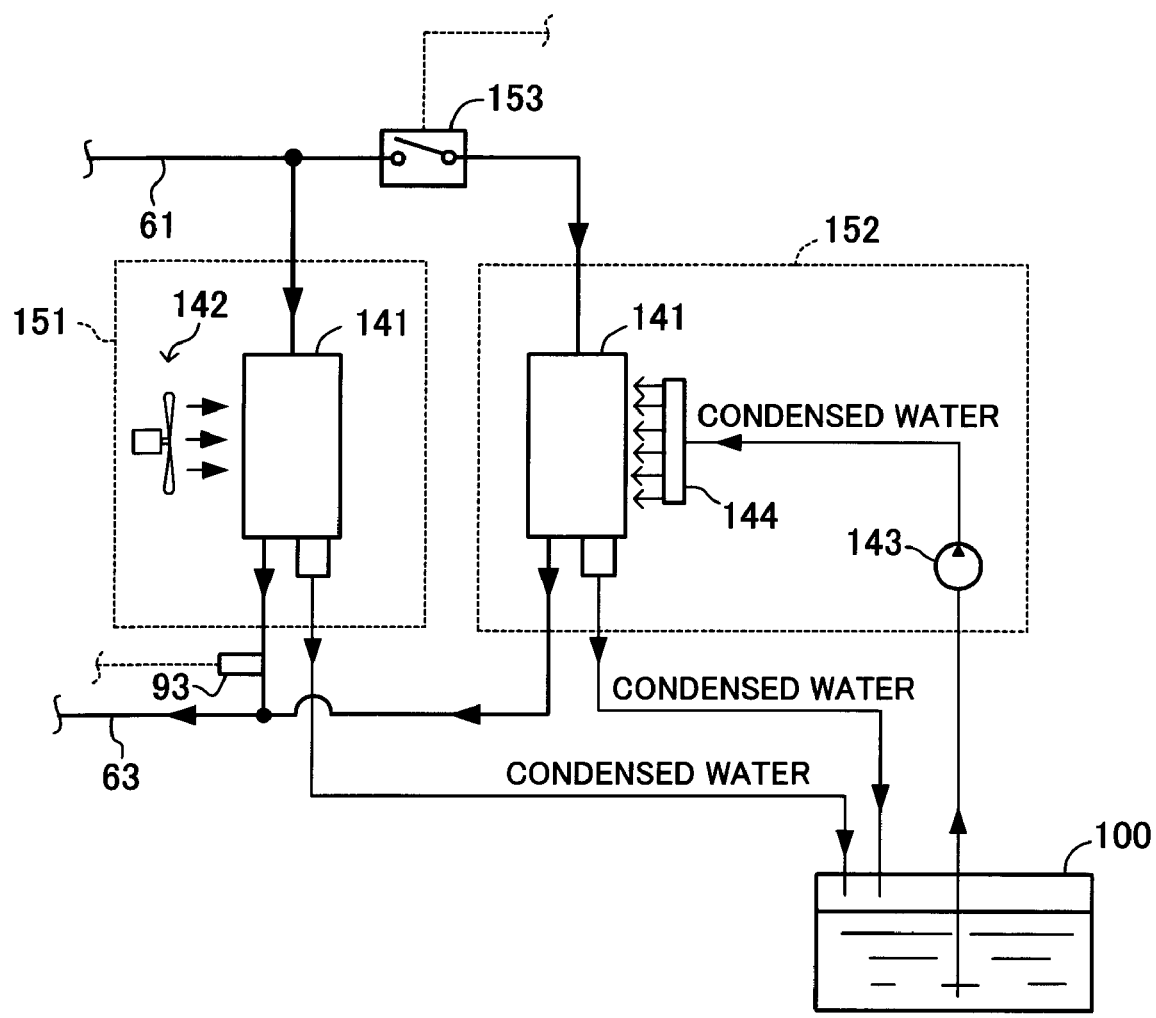
FIG. 9 is a partial schematic view of a working-gas-circulation-type engine according to a third modification of the present invention.
Figure 10:
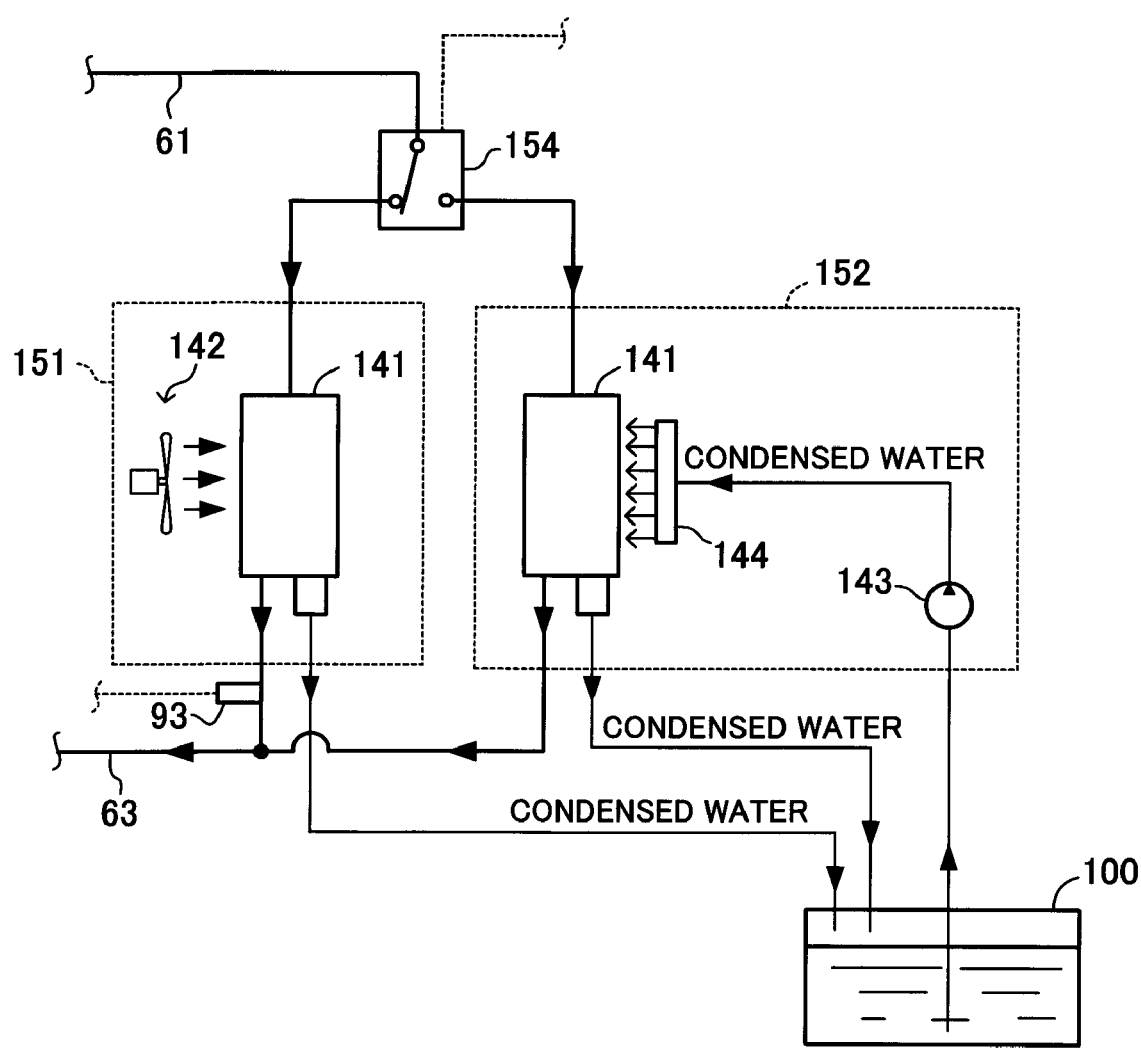
FIG. 10 is a partial schematic view of a working-gas-circulation-type engine according to a fourth modification of the present invention.

More specifically, a working-gas-circulation-type engine according to a third modification shown in FIG. 9 has a first condenser section 151 and a second-condenser section 152.

The first condenser section 151 includes the above-mentioned water vapor separation section 141 and the above-mentioned motor-driven fan 142. The water vapor separation section 141 is disposed between the first passage 61 and the third passage 63. The first condenser section 151 condenses, into water, water vapor contained in the pre-condensation exhaust gas (circulation gas) introduced into the water vapor separation section 141 through the first passage 61 and thereby yields condensed water, through heat exchange of the introduced pre-condensation exhaust gas with the ambient air sent from the motor-driven fan 142. The first condenser section 151 discharges, to the third passage 63, a gas obtained by separating water vapor in the form of condensed water from the pre-condensation exhaust gas. Condensed water which is condensed in the first condenser section 151 is supplied to the water storage tank 100.

The second condenser section 152 is disposed between the first passage 61 and the third passage 63. That is, as mentioned above, the first condenser section 151 and the second condenser section 152 are disposed in parallel along (or with respect to) the flow of the circulation gas flowing through the circulation passage. The second condenser section 152 includes the above-mentioned water vapor separation section 141, the above-mentioned condensed-water spray pump 143, and the above-mentioned condensed-water spray section 144. By virtue of these configurational features, the second condenser section 152 separates water vapor from the pre-condensation exhaust gas (circulation gas) introduced into the water vapor separation section 141 of the condenser section 152 through the first passage 61, through utilization of latent heat of vaporization of condensed water stored in the water storage tank 100. Condensed water which is condensed in the second condenser section 152 is also supplied to the water storage tank 100.

Furthermore, the third modification employs a flow-passage changeover device 153. The flow-passage changeover device 153 is disposed between the first passage 61 and the inlet of the second condenser section 152. In response to a drive signal from the electrical control unit, the flow-passage changeover device 153 establishes a state of connection or a state of shutoff between the first passage 61 and the second condenser section 152.

The CPU obtains the temperature Tex of gas as measured at the outlet of the first condenser section 151 from the gas temperature sensor 93. When the obtained gas temperature Tex is higher than the predetermined temperature Texth, the CPU runs the condensed-water spray pump 143 and causes the flow-passage changeover device 153 to establish connection between the first passage 61 and the second condenser section 152. By this procedure, both of the first condenser section 151 and the second condenser section 152 carry out separation of water vapor from the circulation gas.

As a result, as compared with the case where only the first condenser section 151 carries out separation of water vapor from the circulation gas, a greater quantity of water vapor can be separated from the circulation gas, so that the ratio of specific heats of the gas functioning as the working gas does not decrease. Therefore, the engine according to the present modification can continuously run with high thermal efficiency. Meanwhile, when the gas temperature Tex is equal to or lower than the predetermined temperature Texth, the CPU stops running the condensed-water spray pump 143 and causes the flow-passage changeover device 153 to shut off connection between the first passage 61 and the second condenser section 152. By this procedure, because only the first condenser section 151 carries out separation of water vapor, wasteful consumption of condensed water stored in the water storage tank 100 can be avoided.

Furthermore, a working-gas-circulation-type engine according to a fourth modification of the present invention shown in FIG. 10 differs from the engine according to the third modification only in that the flow-passage changeover device 153 of the third modification is replaced with a flow-passage changeover device 154. The flow-passage changeover device 154 selectively connects either the first condenser section 151 or the second condenser section 152 to the first passage 61, in response to a drive signal from the electrical control unit.

The CPU obtains the temperature Tex of gas as measured at the outlet of the first condenser section 151 from the gas temperature sensor 93. When the obtained gas temperature Tex is equal to or lower than the predetermined temperature Texth, the CPU stops running the condensed-water spray pump 143 and causes the flow-passage changeover device 154 to establish connection between the first passage 61 and the first condenser section 151 and to shut off connection between the first passage 61 and the second condenser section 152. By this procedure, only the first condenser section 151 carries out separation of water vapor from the circulation gas.

On the other hand, when the obtained gas temperature Tex is higher than the predetermined temperature Texth, the CPU runs the condensed-water spray pump 143 and causes the flow-passage changeover device 154 to shut off connection between the first passage 61 and the first condenser section 151 and to establish connection between the first passage 61 and the second condenser section 152. By this procedure, only the second condenser section 152 carries out separation of water vapor from the circulation gas.

Thus, when the obtained gas temperature Tex is higher than the predetermined temperature Texth, a greater quantity of water vapor can be separated from the circulation gas as compared with the case where the first condenser section 151 separates water vapor from the circulation gas. Therefore, the ratio of specific heats of the gas functioning as the working gas does not decrease. As a result, the engine 10 according to the present modification can continuously run with high thermal efficiency.

The invention claimed is:

1. A working-gas-circulation-type engine in which oxygen, a fuel that generates water vapor through combustion, and a working gas higher in ratio of specific heats than water vapor are supplied to a combustion chamber, the fuel is burnt in the combustion chamber so as to expand the working gas and thus output power, and the working gas contained in a post-combustion gas exhausted from the combustion chamber is resupplied to the combustion chamber through a circulation passage, comprising:
a first condenser section provided in the circulation passage and adapted to condense water vapor contained in a circulation gas which is a gas flowing through the circulation passage to yield condensed water, through heat exchange of the circulation gas with the ambient air, thereby separating, from the circulation gas, water vapor which has been condensed into condensed water through the heat exchange; and
a second condenser section provided in the circulation passage and adapted to condense water vapor contained in the circulation gas so as to yield condensed water, by means of cooling the circulation gas through utilization of latent heat of vaporization of condensed water which has been condensed in the first condenser section, thereby separating, from the circulation gas, the water vapor which has been condensed into condensed water through the utilization of latent heat of vaporization.

2. A working-gas-circulation-type engine according to claim 1, wherein:
the first condenser section is an upstream condenser section into which a pre-condensation exhaust gas, which is a gas exhausted from the combustion chamber in a state before undergoing condensation of water vapor and serving as the circulation gas, is introduced and which discharges, as a primary-condensed-water-separated gas, a gas obtained by separating, from the introduced pre-condensation exhaust gas, water vapor which has been condensed into condensed water through the heat exchange with the ambient air; and
the second condenser section is a downstream condenser section into which the primary-condensed-water-separated gas is introduced and which discharges, as a secondary-condensed-water-separated gas, a gas obtained by separating, from the primary-condensed-water-separated gas, water vapor which has been condensed into condensed water through the utilization of latent heat.

3. A working-gas-circulation-type engine according to claim 1 or 2, further comprising a water storage tank for storing condensed water which has been condensed in the first condenser section, wherein:
the second condenser section is configured so as to perform the latent-heat-utilizing cooling by means of using condensed water stored in the water storage tank.

4. A working-gas-circulation-type engine according to claim 1 or 2, wherein the second condenser section is configured so as to perform the cooling through additional utilization of latent heat of vaporization of condensed water which has been condensed in the second condenser section.

5. A working-gas-circulation-type engine according to claim 4, further comprising a water storage tank for storing condensed water which has been condensed in the first condenser section and condensed water which has been condensed in the second condenser section, wherein:
the second condenser section is configured so as to perform the latent-heat-utilizing cooling by means of using condensed water stored in the water storage tank.

6. A working-gas-circulation-type engine according to claim 4, further comprising:
a first water storage tank for storing condensed water which has been condensed in the first condenser section, and
a second water storage tank for storing condensed water which has been condensed in the second condenser section, wherein:
the second condenser section is configured so as to perform the latent-heat-utilizing cooling by means of using condensed water stored in the first water storage tank and condensed water stored in the second water storage tank.

7. A working-gas-circulation-type engine according to claim 1 or 2, further comprising gas-temperature-obtaining means for obtaining a temperature of the circulation gas which has passed through at least the first condenser section, wherein:
the second condenser section is configured such that usage of the condensed water whose latent heat of vaporization is utilized in the second condenser section is adjusted on the basis of the obtained temperature of the circulation gas.

8. A working-gas-circulation-type engine according to claim 7, wherein the gas-temperature-obtaining means is configured so as to obtain a temperature of the circulation gas which has passed through the first condenser section and has not yet been cooled in the second condenser section.

9. A working-gas-circulation-type engine according to claim 8, wherein the second condenser section is configured so as not to use the condensed water when the obtained temperature of the circulation gas is lower than a predetermined temperature.

10. A working-gas-circulation-type engine according to claim 1 or 2, further comprising water-vapor-content-obtaining means for obtaining a water vapor content of the circulation gas, wherein:
   the second condenser section is configured such that usage of the condensed water whose latent heat of vaporization is utilized in the second condenser section is adjusted on the basis of the obtained water vapor content.

11. A working-gas-circulation-type engine according to claim 10, wherein the water-vapor-content-obtaining means is configured so as to obtain the water vapor content of the circulation gas which has passed through the first condenser section and has not yet been cooled in the second condenser section.

12. A working-gas-circulation-type engine according to claim 11, wherein the second condenser section is configured so as not to use the condensed water when the obtained water vapor content is lower than a predetermined water vapor content.

* * * * *